April 14, 1959

M. A. GEHNER 2,881,747

FUEL LINE PRESSURE RELIEF

Filed Jan. 15, 1957

INVENTOR.
MAURICE A. GEHNER
BY *Bertram H. Mann*

ATTORNEY

United States Patent Office 2,881,747
Patented Apr. 14, 1959

2,881,747
FUEL LINE PRESSURE RELIEF

Maurice A. Gehner, Pagedale, Mo., assignor to ACF Industries, Incorporated, New York, N.Y., a corporation of New Jersey Application January 15, 1957, Serial No. 634,227

13 Claims. (Cl. 123—136)

This invention relates to fuel systems for internal combustion engines and more particularly to a system in which a fuel pump delivers liquid fuel under pressure from a fuel tank to a carburetor having a float controlled needle valve to maintain a constant fuel level within a float bowl.

During running of a conventional automobile engine in hot weather, cooling air is circulated over the various parts of the fuel system by means of an engine driven fan and tends to maintain the fuel in the system in a relatively cool liquid condition. Upon stopping of the engine, the highly volatile fuel in the system tends to expand and form gas bubbles, due to the relatively high ambient temperatures and heat radiated from the hot engine, thereby forcing fuel past the float controlled needle valve into the float bowl and causing flooding of the carburetor and a vapor-lock condition in the fuel line between the fuel pump and the carburetor.

It is, therefore, an object of the invention to relieve excessive pressures in the fuel line between the fuel pump and carburetor to prevent flooding of the carburetor and a vapor-lock condition in the system.

Another object of the invention resides in the provision of an engine fuel system embodying a relief valve structure operable responsive to high ambient temperatures and/or heat radiated from the engine to relieve excessively high pressures in the fuel line between the pump and the carburetor to prevent uncontrolled opening of the float controlled needle valve.

A further object of the invention resides in the provision of means operable responsive to initial running of the engine to quickly close the fuel pressure relief valve, if open, to maintain the desired predetermined operating pump pressure in the fuel line between the pump and the carburetor.

Another object of the invention resides in the provision of a valve structure in which a valve stem is enclosed within and actuated by a metallic tubular bonnet having a relatively high coefficient of expansion responsive to variations in temperatures.

The invention embodies other novel features, details of construction and arrangement of parts which are hereinafter set forth in the specification and claims and illustrated in the accompanying drawing, wherein:

Figure 1:
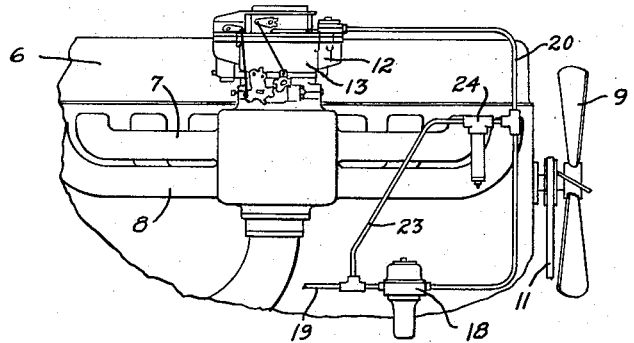
Fig. 1 is a fragmentary side elevational view of an internal combustion engine provided with a fuel system embodying features of the invention.
Figure 3:
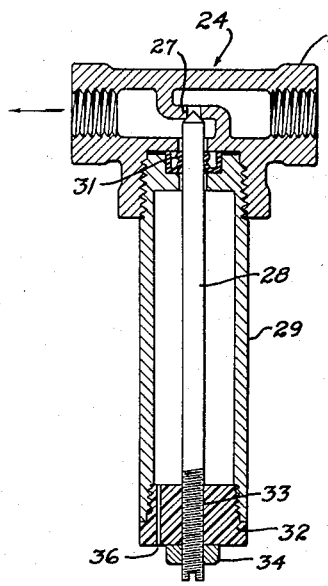
Fig. 3 is a detail vertical sectional view illustrating a pressure relief valve structure embodying features of the invention.
Figure 2:
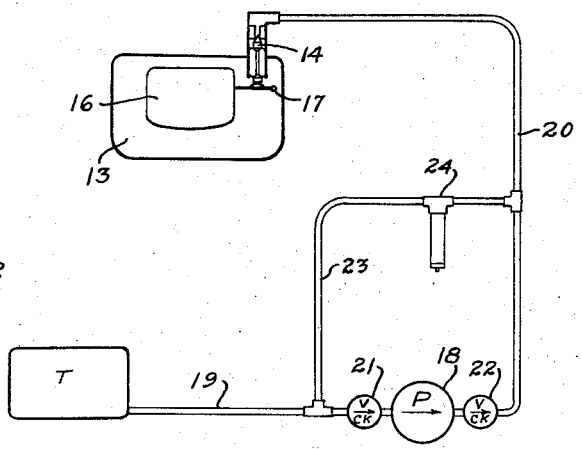
Fig. 2 is a schematic view illustrating the fuel system shown in Fig. 1.

Referring now to the drawing for a better understanding of the invention, the fuel system is shown as applied to a conventional internal combustion engine 6 having an intake manifold 7, an exhaust manifold 8, and a fan 9 driven by a belt 11 from the engine crankshaft during operation of the engine.

A conventional downdraft carburetor 12 is mounted on the intake manifold 7 to supply a fuel mixture to the engine, and may be of the constant fuel level type, as shown and described in Patent No. 2,749,100 to Carlson, to provide a fuel bowl 13 having an inlet needle valve 14 controlled by a float 16 pivotally mounted at 17 on the bowl.

Liquid fuel is supplied to the carburetor 12 in sufficient quantities to satisfy engine requirements by means of a conventional engine driven pump 18 interconnecting fuel lines 19 and 20 leading from a tank T to the carburetor. The pump may be of the diaphragm type, as shown and described in a copending application, Serial No. 317,498, filed October 29, 1952, in the name of Irven E. Coffey, now Patent No. 2,779,553, issued Jan. 29, 1957, provided with an inlet check valve 21 and an outlet check valve 22. In the operation of pumps of this type, the fuel is discharged from the pump under constant pressure and variable volume by means of a compression spring acting against the diaphragm on the discharge stroke thereof.

During normal running of the engine in hot weather, the fuel discharged from the pump into the outlet fuel line 20 is maintained under a constant predetermined pressure and is cooled by a stream of cool air from the fan 9. When the engine is stopped, the fuel in the line 20 is trapped between the pump outlet check valve 22 and the needle valve 14. Due to high ambient temperatures and heat radiated from the hot engine, the volatile fuel tends to expand and form gas bubbles in the fuel line 20, thereby creating an excessive fuel pressure and causing fuel to open the needle valve 14 and flow into the bowl to thus flood the carburetor.

To relieve the fuel line of excessive fuel pressure due to elevated temperatures, the fuel system is provided with a by-pass line 23 extending around the pump P from the outlet fuel line 20 back to the inlet fuel line 19. A valve 24 is interposed in the by-pass line 23 and is shown as comprising a body 26 having a valve seat 27 engageable by the tapered end of a long valve needle 28 formed of steel or other metal having a relatively low coefficient of expansion.

A long tubular bonnet 29 is threaded into the valve body 26 to receive the needle 28 and is formed of metal, such as aluminum, having a relatively high coefficient of expansion. A resilient seal 31 is tightly engaged between the body 26 and bonnet 29 and formed with an aperture to snugly receive the needle 28.

A plug 32 is threaded into the outer end of the bonnet 29 and formed with a threaded opening 33 to receive the threaded outer end of the needle 28. The need 28 is adjustable axially of the bonnet and provided with a lock nut 34. If desired, the plug may also be provided with a drain opening 36. To minimize the transfer of heat from the bonnet 29 to the needle 28, the plug 32 is formed from a suitable material having a relatively low coefficient of heat conductivity, such as Bakelite or steel.

As illustrated in Fig. 1, the valve bonnet 29 is disposed close to the exhaust manifold 8 adjacent the forward end of the engine and in the line of travel of the stream of cool air from the fan 9. When the engine is running, cool air from the fan is directed against the valve bonnet which acts to urge the needle 28 against its seat 27 to prevent a flow of fuel through the by-pass line 23. When the engine is in a heated condition and is stopped, heat radiated from the exhaust manifold and other parts of the engine to the valve 24 causes the bonnet 29 to expand axially and move the needle 28 away from its seat 27 to relieve the fuel pressure in the fuel line 20 between the pump outlet check 22 and needle valve 14 to thereby prevent flooding of the carburetor due to excessive fuel pressures in the line acting to open the float controlled needle valve 14. It will be understood that a very slight movement of the needle 28 from its seat 27 is sufficient to relieve the pressure in the fuel line 20.

While the invention has been shown in but one form, it is obvious to those skilled in the art that it is not so limited but is susceptible of various changes and modifications without departing from the scope of the invention as defined by the appended claims.

I claim:

1. In a fuel system for an internal combustion engine comprising a fan to circulate a stream of air, a carburetor having a fuel inlet, a float-controlled needle valve in said inlet, a fuel pump having inlet and outlet check valves, an inlet fuel line leading from a tank to said inlet check valve, an outlet fuel line leading from said outlet check valve to said fuel inlet, a fuel by-pass line leading from said outlet line to said inlet line, a valve in said by-pass line, valve actuating means operable responsive to heat from the engine to open said by-pass valve when the engine and fan are stopped and operable responsive to contact with cool air from the fan to close said by-pass valve during operation of the engine and fan.

2. In a fuel system for an internal combustion engine comprising a fan to circulate a stream of air, a carburetor having a fuel inlet, a float-controlled needle valve in said inlet, a fuel pump having inlet and outlet check valves, an inlet fuel line leading from a tank to said inlet check valve, an outlet fuel line leading from said outlet check valve to said fuel inlet, a fuel by-pass line leading from said outlet line to said inlet line, a vave in said by-pass line, valve actuating means operable responsive to heat from the engine to open said by-pass valve when the engine and fan are stopped and operable responsive to contact with cool air from the fan to close said by-pass valve during operation of the engine and fan, said by-pass valve having a valve body and a metallic stem, and said valve actuating means including a metallic tubular bonnet secured on said body to encircle said stem, and means securing the outer ends of said bonnet and stem to each other.

3. In a fuel system for an internal combustion engine comprising a fan to circulate a stream of air, a carburetor having a fuel inlet, a float-controlled needle valve in said inlet, a fuel pump having inlet and outlet check valves, an inlet fuel line leading from a tank to said inlet check valve, an outlet fuel line leading from said outlet check valve to said fuel inlet, a fuel by-pass line leading from said outlet line to said inlet line, a vave in said by-pass line, valve actuating means operable responsive to heat from the engine to open said by-pass valve when the engine and fan are stopped and operable responsive to contact with cool air from the fan to close said by-pass valve during operation of the engine and fan, said by-pass valve having a valve body and a metallic stem, and said valve actuating means including a metallic tubular bonnet secured on said body to encircle said stem, and means securing the outer ends of said bonnet and stem to each other, said bonnet having a higher coefficient of expansion than said stem.

4. In a fuel system for an internal combustion engine comprising a fan to circulate a stream of air, a carburetor having a fuel inlet, a float-controlled needle valve in said inlet, a fuel pump having inlet and outlet check valves, an inlet fuel line leading from a tank to said inlet check valve, an outlet fuel line leading from said outlet check valve to said fuel inlet, a fuel by-pass line leading from said outlet line to said inlet line, a valve in said by-pass line, valve actuating means operable responsive to heat from the engine to open said by-pass valve when the engine and fan are stopped and operable responsive to contact with cool air from the fan to close said by-pass valve during operation of the engine and fan, said by-pass valve having a valve body and a metallic stem, and said valve actuating means including a metallic tubular bonnet secured on said body to encircle said stem, means securing the outer ends of said bonnet and stem to each other, said bonnet having a higher coefficient of expansion than said stem, and means to adjust said stem axially of said bonnet.

5. In a fuel system for an internal combustion engine comprising an exhaust manifold and a fan, a pump having an inlet line from a tank and an outlet line to a carburetor, an outlet check valve and a float-controlled inlet needle valve associated with said pump and carburetor, respectively, a by-pass line interconnecting said inlet and outlet lines, a pressure control valve in said by-pass line, means operable responsive to an increase in temperature to open said pressure control valve to relieve the fuel pressure in said outlet line upon stopping of the engine.

6. In a fuel system for an internal combustion engine comprising an exhaust manifold, a pump having an inlet line from a tank and an outlet line to a carburetor, an outlet check valve and a float-controlled inlet needle valve associated with said pump and carburetor, respectively, a by-pass line interconnecting said inlet and outlet lines, a pressure control valve in said by-pass line, means located adjacent the manifold operable responsive to an increase in temperature to open said pressure control valve to relieve the fuel pressure in said outlet line upon stopping of the engine, said means being operable responsive to a decrease in temperature to close said pressure control valve.

7. In a fuel system for an internal combustion engine comprising an exhaust manifold and a fan, a pump having an inlet line from a tank and an outlet line to a carburetor, an outlet check valve and a float-controlled inlet needle valve associated with said pump and carburetor, respectively, a by-pass line interconnecting said inlet and outlet lines, a pressure control valve in said by-pass line, means located adjacent the manifold operable responsive to an increase in temperature to open said pressure control valve to relieve the fuel pressure in said outlet line upon stopping of the engine, said means being operable responsive to a decrease in temperature to close said pressure control valve, said means being located in the line of travel of and cooled by a stream of air from the fan during operation of the engine whereby said pressure control valve is closed.

8. In a fuel system for an internal combustion engine comprising an exhaust manifold and a fan, a pump having an inlet line from a tank and an outlet line to a carburetor, an outlet check valve and a float-controlled inlet needle valve associated with said pump and carburetor, respectively, a by-pass line interconnecting said inlet and outlet lines, a pressure control valve in said by-pass line, means located adjacent the manifold operable responsive to an increase in temperature to open said pressure control valve to relieve the fuel pressure in said outlet line upon stopping of the engine, said means being operable responsive to a decrease in temperature to close said pressure control valve, said means being located in the line of travel of and cooled by a stream of air from the fan during operation of the engine whereby said pressure control valve is closed, said means comprising a length of metal having a high coefficient of expansion.

9. In combination with a heat engine including engine operated cooling means, a fuel supply system including a source of fuel under pressure, a conduit for delivering fuel from said source to the engine, a pressure relief vent in said conduit, a valve controlling said vent, and thermostatic means controlling said valve and exposed to the engine heat and said cooling means, said thermostatic means being adjusted to maintain said valve closed when said cooling means is operated and responding to stoppage of said cooling means and engine heat radiated shortly after stoppage of the engine to open said vent valve.

10. A fluid supply system for a heat engine including engine cooling means, a source of fluid fuel under pressure, a conduit for delivering the fuel to the engine, a pressure relief vent in said conduit, a valve controlling said vent, thermostatic means responsive to engine operation for closing said valve and also responsive to stoppage of the engine for opening said valve.

11. In combination with a heat engine, a fuel supply system including a source of fuel under pressure, a conduit for delivering fuel from said source to the engine, a pressure relief vent in said conduit, a valve controlling said vent, and thermostatic means controlling said valve and exposed to the engine heat, said thermostatic means being adjusted to maintain said valve closed when said engine is running and responsive to stoppage of said engine to open said vent valve.

12. In a fuel supply system for a heat engine, a source of fluid fuel under pressure, a conduit for delivering fuel from said source to the engine, a pressure relief vent in said conduit, a valve controlling said vent, and means responsive to an increase in temperature for opening said valve and to a decrease in temperature for closing said valve.

13. In a fuel supply system for a heat engine, a source of fluid fuel under pressure, a fuel supply conduit for delivering fuel from said source to the engine, a pressure relief vent in said conduit, a valve controlling said vent, and means responsive to an increase in engine ambient temperature for opening said valve to relieve the pressure in said fuel supply conduit, and also responsive to a decrease in engine ambient temperature for closing said valve.

References Cited in the file of this patent

UNITED STATES PATENTS

| | | |
|---|---|---|
| 742,494 | Roesch | Oct. 27, 1903 |
| 1,278,001 | Parisen | Sept. 3, 1918 |
| 2,284,709 | Zoder | June 2, 1942 |
| 2,638,883 | Simon | May 19, 1953 |